United States Patent
Bögel et al.

(10) Patent No.: US 6,879,921 B2
(45) Date of Patent: Apr. 12, 2005

(54) DEVICE FOR MEASURING DISTANCES, DISTANCE MEASURER AND STOP ELEMENT THEREFOR

(75) Inventors: Gerhard Bögel, Balgach (CH); Thomas Böach, Lustenau (AT)

(73) Assignee: Leica Geosystems, A.G., Heerbrugg (CH)

( * ) Notice: Subject to any disclaimer, the term of this patent is extended or adjusted under 35 U.S.C. 154(b) by 0 days.

(21) Appl. No.: 10/451,052
(22) PCT Filed: Dec. 17, 2001
(86) PCT No.: PCT/EP01/14873
§ 371 (c)(1), (2), (4) Date: Oct. 29, 2003
(87) PCT Pub. No.: WO02/50564
PCT Pub. Date: Jun. 27, 2002

(65) Prior Publication Data
US 2004/0078163 A1 Apr. 22, 2004

(30) Foreign Application Priority Data
Dec. 21, 2000 (CH) ............................................. 2493/00

(51) Int. Cl.$^7$ ........................... G01C 25/00; G01P 21/00
(52) U.S. Cl. ......................................... 702/97; 73/1.79
(58) Field of Search ........................... 702/97; 356/614; 73/1.79

(56) References Cited

U.S. PATENT DOCUMENTS

| | | | | |
|---|---|---|---|---|
| 3,894,805 A | * | 7/1975 | Middleton | 356/138 |
| 4,295,201 A | * | 10/1981 | Wiklund | 702/158 |
| 4,717,251 A | * | 1/1988 | Wells et al. | 356/4.08 |
| 4,856,894 A | * | 8/1989 | Anderson | 356/15 |
| 5,959,734 A | * | 9/1999 | Tanaka et al. | 356/614 |
| 6,144,308 A | * | 11/2000 | Dunne | 340/689 |
| 6,324,888 B1 | * | 12/2001 | Schmidt et al. | 73/1.79 |
| 6,529,281 B2 | * | 3/2003 | Takeshita et al. | 356/614 |
| 6,621,583 B1 | * | 9/2003 | Yoshida | 356/614 |

* cited by examiner

Primary Examiner—Michael Nghiem
Assistant Examiner—Toan M. Le
(74) Attorney, Agent, or Firm—Van Dyke, Gardner, Linn & Birkhart, LLP (57) ABSTRACT

The invention relates to a device for measuring distances having a distance measurer (1) and a stop element (3; 3'; 3") enabling precise and mechanically stabile fixed installation on any form of top surfaces. Interchangeable stop elements (3; 3'; 3") are disposed on a distance measurer (1), and embodied on the side thereof which is orientated towards the object to be measured in such a way that exact installation can take place on the surface of the object. Another use of the stop element is that it can inc;lude a receiving element for securing a distance measurer (1), whereby the distance measurer is pivotally mounted about at least one horizontal rotational axis (12) whilst the distance measurer (1) is in use. The stop element (3") is formed in such a way that it is possible to adjust the device and subsequently measure different measuring points (C,D) without having to take geometric changes into account as a result of said adjustment.

21 Claims, 5 Drawing Sheets

DEVICE FOR MEASURING DISTANCES, DISTANCE MEASURER AND STOP ELEMENT THEREFOR

BACKGROUND OF THE INVENTION

The invention relates to a device for measuring distances according to the preamble of claim 1, and a distance-measuring instrument for this device according to the preamble of claim 5 and a stop element for this device according to the preamble of claim 7.

Devices for measuring distances, comprising a combination of a distance-measuring instrument, preferably a laser distance-measuring instrument, and a holder for positioning and for fixing the distance-measuring instrument, are generally known and are used in many areas. These holders effect exact positioning of the distance-measuring instrument relative to a reference point, so that various measurements can be transferred to a common reference system. Moreover, they ensure stable retention during the measuring process.

A point which serves as a reference point for measured distances, is to be defined here as the reference point, i.e. all values actually measured by the distance-measuring instrument must be converted so that they correspond to the distances in the reference system. As a rule, in the case of an installation at a point, for example at a wall in a building, it is therefore also necessary to take into account the housing parts of the distance-measuring instrument and any installation parts which serve for positioning the distance-measuring instrument.

The holders of the prior art are generally in the form of tripods and the distance-measuring instrument is fastened by means of a thread and threaded bush, mobility about two axes (horizontal and vertical) generally being ensured. This type of holder is used in particular in the area of geodetic surveys.

In other areas, too, it is necessary to install the distance-measuring instrument on an object or a reference point in a defined manner in order to permit an exact measurement of the distance to another object. In particular, use in the construction sector requires a high accuracy of measurement in the case of a very wide range of surfaces and reference points. Examples of such measurements are building spacings, ceiling heights and internal diameters of openings. Owing to the building structures, measurements frequently also have to be carried out from corners, resulting in particular requirements with respect to size and handling properties of the distance-measuring instrument. The frequently highly structured ground gives rise to problems with the exact installation and hence the positioning of the distance-measuring instrument. For example, holes, edges, rounded areas or wire meshes make it more difficult to position the device exactly. It may also be of interest to be able to survey liquid levels, for example the water level in a space; however, the surveying of liquid surfaces by means of the distance-measuring instruments of the prior art is not possible without complicated aids.

The main requirement with regard to the holder is thus associated with the positioning of the distance-measuring instrument relative to a point or in a plane, by means of which the various measurements can be transferred to a standard reference system. Moreover, the achievable accuracy during the measuring process can be increased by mechanically firm fixing.

The main difficulties here are the defined installation at the reference point to be surveyed and the mechanically sufficiently stable fixing of the device during the measurement on the object. A defined installation can be realized only with difficulty particularly in the case of poorly accessible points, such as, for example, in angled surfaces, or in the case of objects having a disadvantageous surface, such as, for example, a very soft or curved surface. In addition to the accessibility of the measuring point, which can be ensured, for example, by a simple, hinged spike, there is a requirement for secure fixing of the measuring device during the measurement. Aids necessary for this purpose frequently result in a deviation from the ideal installation at the measuring point. The distance-measuring instrument must be positioned with the aid of a holder or a supporting construction. If the distance-measuring instrument cannot be installed therewith directly at the point actually to be surveyed, at least the distance from the actual measuring location to this point must be known.

If a measuring stop is used for the installation, as can also be assumed to be known from other areas of measurement technology, this additional distance of the measuring point, produced by the measuring stop, must be taken into account in the measurement.

The realization of such a measuring system is subject to various specifications. The requirements with regard to the measuring device are good handling properties, the necessary precision and a small size which makes it possible to reach and to survey all relevant areas.

The generally hand-held laser distance-measuring instruments used for this purpose are widely employed. A device of this type is described, for example, in EP 0 738 899 B1.

The exact positioning of the distance-measuring instrument on the object to be measured generally proves problematic. Thus, for example, the measurement of a distance between a smooth wall and pipe requires the installation of a distance-measuring instrument on a curved surface if the advantage of a wall as a flat reflecting surface is to be retained.

It is the technical object of the present invention to provide a device and its components comprising distance-measuring instrument and stop element, which ensure defined and sufficiently fixed installation of the distance-measuring instrument on surfaces of virtually any desired shape.

SUMMARY OF THE INVENTION

This object is achieved, according to the invention, by the defining features of claims 1, 5 and 7. Advantageous and alternative embodiments and further developments of the device are evident from the features of the subclaims.

In the subject of the invention, an exchangeable stop element whose side facing the object from which the measurement is to be effected can be substantially adapted to said object is mounted on a—preferably hand-held—distance-measuring instrument. Thus, both exact positioning relative to the reference point to be surveyed and firm mounting on the surface can be achieved.

The separation of measuring point and reference point which is caused by the positioning of the measuring device necessitates a correction of the distance given by the distance-measuring instrument. This correction can be automatically calculated by an integrated computer if the required dimensions of the stop element are exactly known as correction data.

In principle, it is also possible, in an alternative realization, to dispense with an integrated computer and to calculate the required correction externally on the basis of the specified data of the stop element.

It is also possible in principle to use the device according to the invention to calculate the distance to a plurality of reference points simultaneously with a single measurement.

The substantially freely designable object side of the stop element makes it possible to provide stop elements for all shapes and surfaces. Even the use of a float as a stop element for measuring the distance from liquid surfaces to reference objects can be realized.

A version which is particularly easy to handle is a stop element providing adjustable and universally applicable installation. This may be, for example, in the form of a telescopic arm which, after its installation on the object to be surveyed, automatically measures its length and automatically transmits this value for calculation of the correction.

A further advantageous possible use is the calculation of distances to points which are basically inaccessible, such as, for example, pipe axes. A diameter-specific collar as a stop element makes it possible to mount the measuring device on a pipe. The measured value can then be corrected directly so that the distance to the middle of the pipe is output. By means of this procedure, the computational effort and time requirement are substantially reduced, particularly in the case of relatively large measurement series. The collar may be designed to be adjustable, as in the above example of the telescopic arms.

A further advantageous possible use of the exchangeable stop element is its use as a stop element for a holder which serves as an installation point for measurements. In geodetic applications, a tripod stand is generally used here as a mount and holder for the distance-measuring instrument. Here, the mounted distance-measuring instrument is mounted so as to be rotatable about a vertical axis, so that a plane which can generally be levelled by adjustment facilities in the tripod stand is defined by the movement about this axis.

For surveys of two or more points which are outside this horizontal rotational plane of the distance-measuring instrument relative to the holder, the distance-measuring instrument must be pivoted about a horizontal axis. By means of a measurement of two points located one on top of the other, the height difference can in principle be determined.

The present state of the art for holding laser distance-measuring instruments comprises a threaded bush which is perpendicular to the emission axis of the distance-measuring instrument and which is engaged by a screw of the stand mount. Measuring device and stand are connected to one another in this way so that the distance-measuring instrument is mounted so as to be rotatable about an axis passing through this connection and oriented perpendicular to said distance-measuring instrument.

Since, in the case of mounts of this design, the axis of rotation and the axis of laser emission or of laser detection have no common point of intersection, pivoting results in differing positionings between the reference points of distance-measuring instrument and tripod, which have to be compensated computationally for highly accurate measurements.

It is the technical object to provide a device which makes it possible to attach a distance-measuring instrument to a mount—preferably a tripod—so as to be rotatable about a horizontal and a vertical axis, so that the pivot movement does not give rise to any corrections of the measured distances.

This object is achieved, according to the invention, by the defining features of claim 10. Advantageous embodiments and further developments of the device are evident from the features of the subclaims.

In the subject of the invention, a device for measuring distances which is fastened to a holder is formed from a—preferably hand-held—distance-measuring instrument and a—preferably exchangeable—stop element. The stop element is mounted on the distance-measuring instrument in such a way as to ensure a mechanically stable connection between distance-measuring instrument and holder, which connection is pivotable about at least one axis relative to the holder.

According to the invention, this stop element effects positioning of the distance-measuring instrument relative to the holder so that the point of intersection of all axes of rotation of the distance-measuring instrument relative to the holder lies on an axis or between a plurality of axes of beam paths used for the distance measurement.

If axes of rotation and axes used for the distance measurement intersect at a point, this can be used as a reference point of the distance measurement and a correction can be omitted. If the point of intersection of all axes of rotation lies between a plurality of axes of beam paths used for the distance measurement, there are in principle still slight deviations due to pivot movements, but these can be neglected in the case of beam paths which are sufficiently close to one another.

A possible, exemplary realization of a stop element according to the invention comprises the mounting of a straight stop element on that side of a commercial, hand-held laser distance-measuring instrument which is opposite the laser emission. The stop element is mounted on a stand by means of thread and threaded bush so that an axle mounted on the stop element—for example a hinge—lies in the axis of the beam path used for the distance measurement.

The main requirement with regard to the stop element thus relates to the positioning of the distance-measuring instrument relative to one or more axes of rotation, which in principle can be located on the stop element or on the holder.

A difficulty here is the defined installation at the reference point defined by the point of intersection of the axes. Since, owing to the stop element, the distance-measuring instrument cannot be installed directly at the reference point, the additional distance to this point, produced by the stop element, must be known.

The electronics required for the calculation can in principle be implemented as an analog circuit or as a digital computer in the device. A correction can then be effected by a modification of the circuit or by calculation using correction data in the digital computer. The correction data can in principle be polled at the beginning of a measuring process and input manually or read in automatically and, after temporary storage in the computer, used repeatedly for calculations.

However, constant polling for each newly required calculation can also be realized. Automatic identification of the stop element with reading in of the correction data is a particularly advantageous design since it is user-friendly.

If, according to the invention, the device has the means for calculating the correction, either the corrected value directly or the required correction distance can be specified. If the stop element has an automatically detectable identifier, the distance-measuring instrument recognizes the element mounted in each case and can independently calculate the correction without additional inputs after installation on the object. The required data of the stop element can be stored in said element itself or in the distance-measuring instrument. Furthermore, the means for calculating the corrected distance or the necessary correction distance can in principle be housed both in the distance-measuring instrument and in the stop element or in both parts together.

The location of data storage and calculation of the correction is dependent on the exact design of the device. It is therefore possible to realize a standardized distance-measuring instrument on which it is possible to mount complex, multiply adjustable stop elements which are offered by a very wide range of manufacturers, in some cases exclusively for highly specialized applications. For this group, calculation in the stop element has the advantage of being able to store all necessary and manufacturer-specific data exclusively in the exchangeable stop element and of acquiring only the measured distance from the comparatively standardized measuring device. However, this solution is disadvantageous with regard to the complexity of the stop element.

The other possibility, calculation in the distance-measuring instrument, has the advantage of the simple, economical stop elements but necessitates storage of the type-specific data in the distance-measuring instrument or storage in the stop element and transmission to the measuring device. However, this solution has advantages if it is intended to employ a stop element having adjustable components, since the current settings or correction values then have to be transmitted in any case.

The identification of the stop element can in principle be effected in various ways, it being possible to realize both straightforward recognition of the stop element without storage of information and transmission of data stored in the intelligent stop element.

For example, the respective type of stop element can be recognized purely mechanically and without data storage in this element from the design of the plug connector. Identification could be effected here, for example, by means of a special plug in a component and the positions of a plurality of pins in the other component in each case, the presence or absence of pins in their positions ensuring binary coding.

A further possibility comprises mounting of magnets, from the position of which it is possible to conclude the type of stop element. The detection of the magnets can be effected, for example, using the Hall effect.

On the other hand, for example, electronic variants permit the use of integrated circuits and memory modules on which a larger number of data can be stored in the stop element and can be read out when required by the measuring device. The same applies to optical or electromagnetic storage media, for example magnetic stripes. The transmission of the data can be effected, for example, by electrical contacts or via electromagnetic radiation, for example by means of a resonant circuit. The last-mentioned possibility has the advantage that the stop element can be designed without external contacts, with the result that a tighter seal between distance-measuring instrument and stop element can be realized in a simple manner so that the influence of external conditions, such as, for example, tough physical ambient conditions due to humidity or dust, on the use of the instrument is reduced.

It is the object of the device according to the invention to achieve substantially improved handling and reduced time requirement in combination with the same or improved precision of the distance measurement.

BRIEF DESCRIPTION OF THE DRAWINGS

The device according to the invention is described in more detail below, purely by way of example, with reference to embodiments shown schematically in the drawing. Specifically.

DETAILED DESCRIPTION OF THE PREFERRED EMBODIMENT

Figure 1:
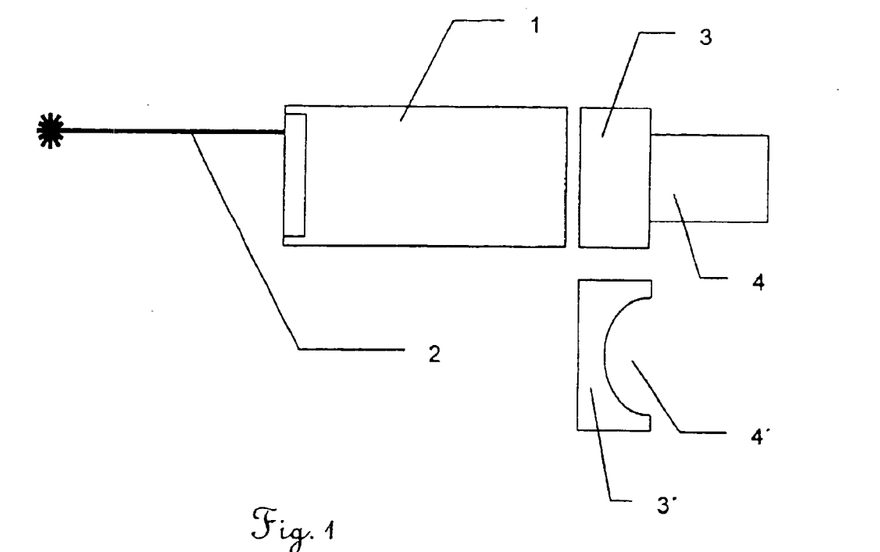
FIG. 1 shows an overall diagram of a device comprising distance-measuring instrument having two exchangeable stop elements.

FIG. 1 shows the possibility of mounting a first stop element 3 and a second stop element 3' on a distance-measuring instrument 1. The exchangeable mounting is effected here, by way of example, on the side which is opposite the emission of a laser beam 2, but mounting at another location of the distance-measuring instrument 1 is not ruled out herewith. The first stop element 3 and the second stop element 3' have been optimized for different surfaces. Here, a first stop element 3 having an installation spike 4 for installation in holes or angles and a second stop element 3' having a curved recess 4' for installation on pipes or other spherically shaped bodies are shown by way of example. An adjustable design of the curved recess 4' permits installation on surfaces having different radii of curvature.

Figure 2:
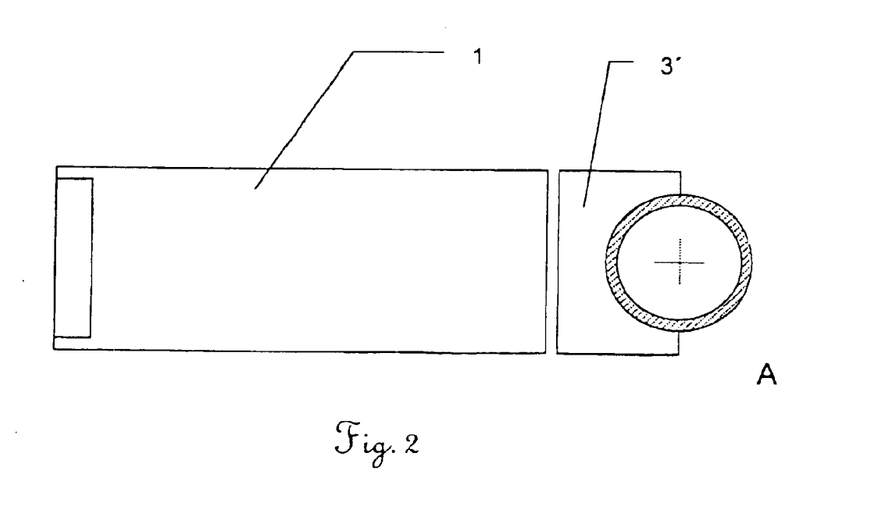
FIG. 2 shows an exemplary application of the device having a specially shaped stop element which, for example, permits installation on a pipe.

FIG. 2 shows, by way of example, the use of the second stop element 3' for defined installation of the device according to the invention on a curved installation surface, for example a pipe A. Defined positioning of the distance-measuring instrument 1 relative to the pipe A can be achieved by a mechanically strong connection between the two parts of the device, i.e. distance-measuring instrument 1 and second stop element 3'.

Figure 3:
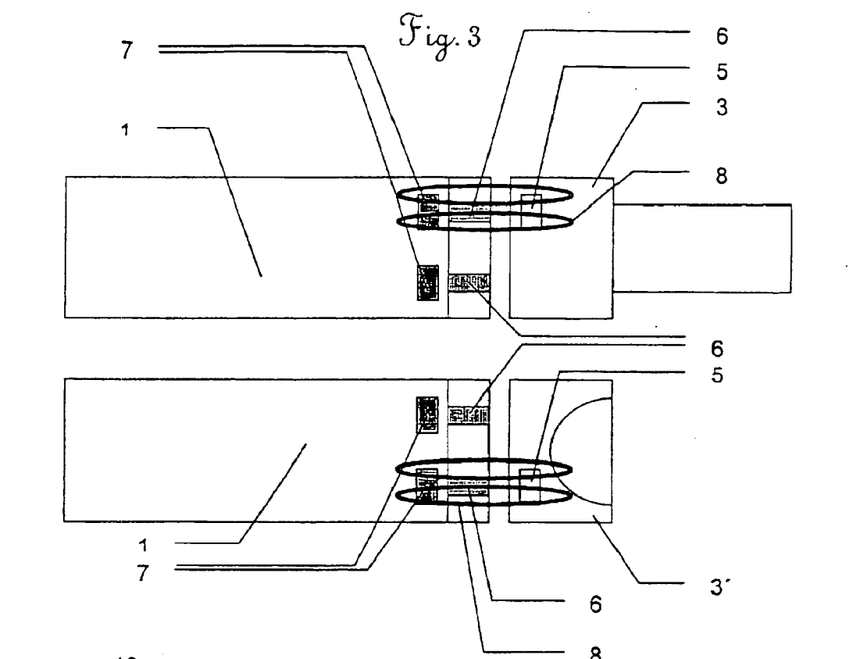
FIG. 3 shows a possibility of identifying various stop elements by means of magnets and Hall elements.

The identification of the first stop element 3 or second stop element 3' by the distance-measuring instrument 1 can be effected, for example, by the use, shown in FIG. 3, of magnets 5 and Hall elements 7. In the first stop element 3 or second stop element 3', magnets 5 are mounted at different positions unique to the respective stop element. The magnetic field is made detectable for the Hall elements 7 by magnetic field conductors 6 in the distance-measuring instrument 1. In the examples shown, in each case only one of the two Hall elements 7 detects a magnetic field which is generated by the magnets 5 mounted specifically for the first stop element 3 or second stop element 3'. Thus, the unique identification of the first stop element 3 or second stop element 3' is possible solely by the determination of the signal of one of the two Hall elements.

Figure 4:
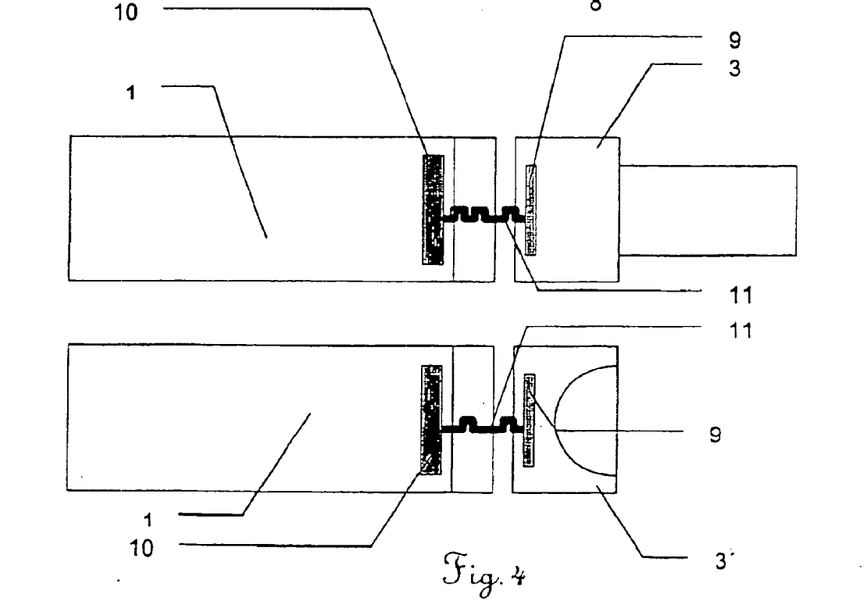
FIG. 4 shows a further possibility of identifying various stop elements by means of electronic memory chips.

Another possibility is the identification, shown in FIG. 4, by means of memory modules 9. The first stop element 3 and second stop element 3' each contain a memory module 9, for example an electronic one, in which the data specific to the first stop element 3 and second stop element 3' are stored. These data can be transmitted as an electromagnetic signal 11 and received and further processed by electronics 10 present in this example in the distance-measuring instrument 1.

Figure 5:
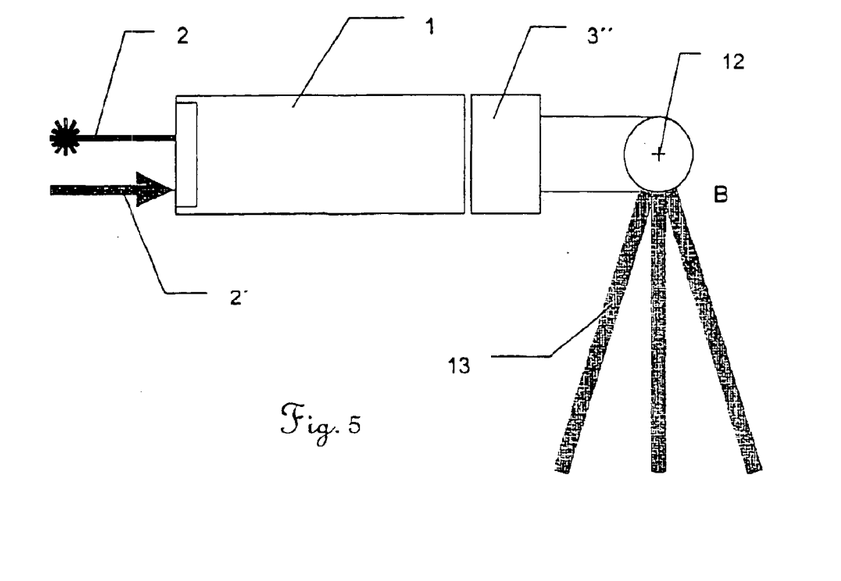
FIG. 5 shows an overall diagram of a device according to the invention, comprising distance-measuring instrument and stop element for connection to a holder.

FIG. 5 schematically shows a device according to the invention with the use of a stop element as a stop element, consisting of a laser distance-measuring instrument 1, which is fastened on its side opposite the laser beam 2 to an exchangeable stop element 3", and a stand shown by way of example here as a tripod. The connection between laser distance-measuring instrument 1 and stand mount 13 is effected via the stop element 3" rotatably mounted at the point of intersection B of a horizontal axis 12 and a vertical axis. The axes of the laser beam 2 and of the laser detector 2' are coaxial or are close together and pass through or in the immediate vicinity of the point of intersection of the axes of rotation.

Figure 6:
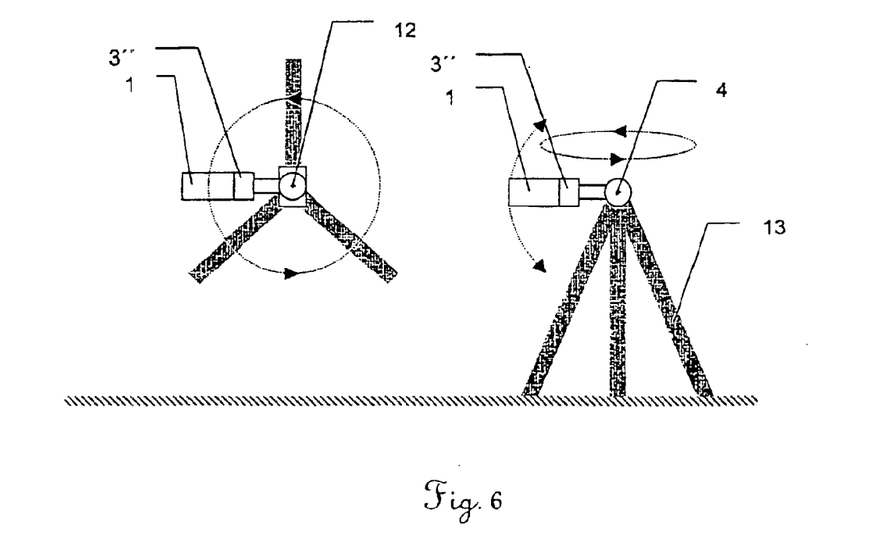
FIG. 6 shows the possible movements of the total system comprising the device and a stand mount, shown by way of example, as a holder.

FIG. 6 shows the possible rotations of the components laser distance-measuring instrument 1 and stop element 3", which are connected to one another, about a horizontal axis of rotation 12 and a vertical axis of rotation 12'.

Figure 7:
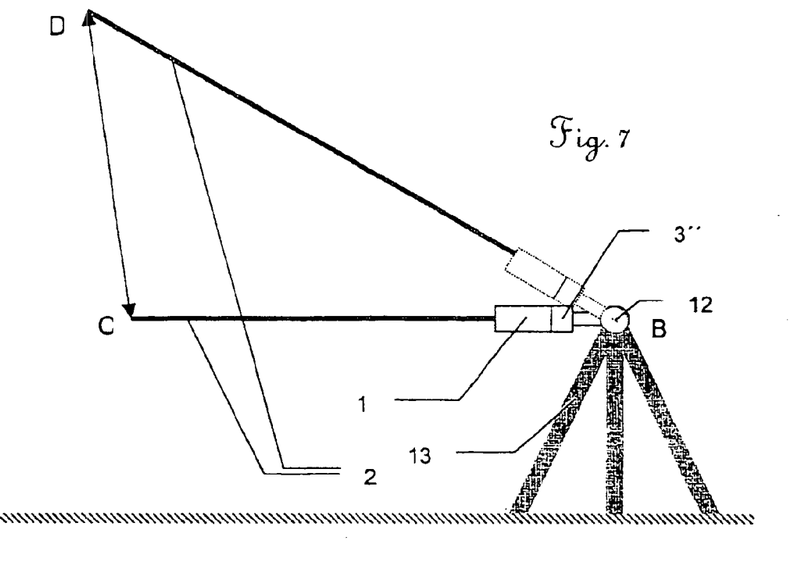
FIG. 7 shows the function and the prevailing geometric conditions of the device according to the invention, comprising a stop element for connection to a holder, with a vertical difference between measuring points.

FIG. 7 shows the use of the device according to the invention and of a stand mount, shown by way of example, for measuring the height difference between a lower measuring point C and an upper measuring point D. The device consisting of distance-measuring instrument 1 and stop element 3" is connected at the point of intersection B of the vertical and horizontal axes of rotation 12 to the stand mount 5 so as to be pivotable about the horizontal axis of rotation 12. After a measurement of the distance to the measuring point C by means of laser beam 2, the device is rotated about the horizontal axis of rotation 12 and the distance to the upper measuring point D is measured in an identical manner. From knowledge of the two distances and of the angle in between, the height difference can be calculated.

Figure 8:
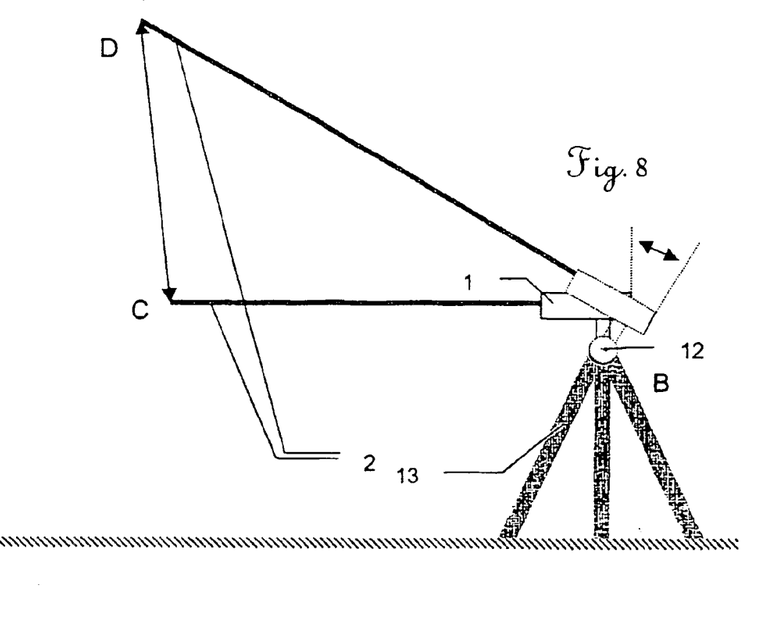
FIG. 8 shows the function and the prevailing geometric conditions of a comparable device of the prior art, with a vertical difference between measuring points.

FIG. 8 shows a similar procedure using a device of the prior art. The horizontal axis of rotation 12 of the laser distance-measuring instrument 1 is now substantially below the axis of the laser beam 2.

Figures 9A, 9B:
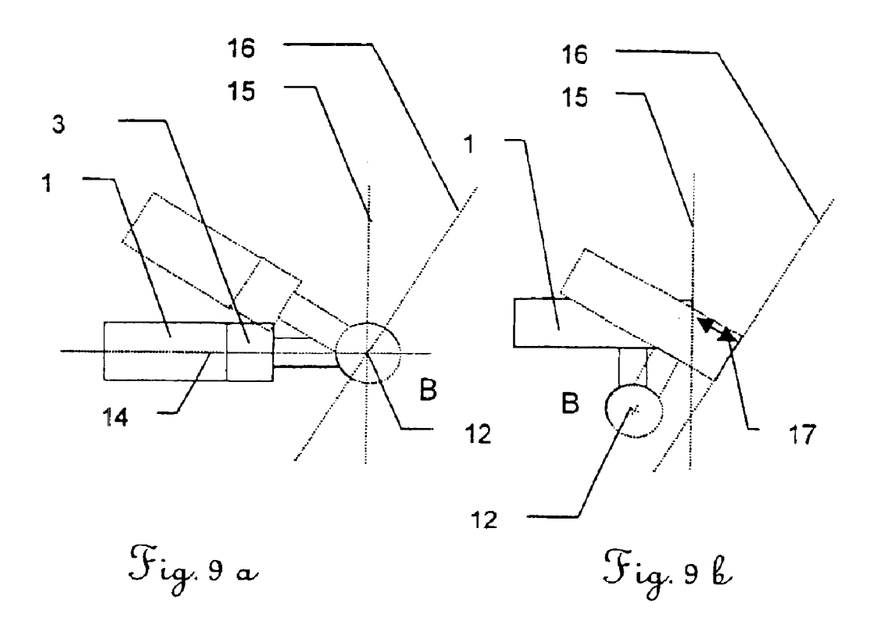
FIG. 9 shows the different geometric conditions in the case of a device according to the invention, comprising a stop element for connection to a holder, and in the case of a device of the prior art.

The exact conditions and the differences between the two devices are shown in FIG. 9. In FIG. 9a, vertical and horizontal axes of rotation 12 coincide with the longitudinal axis 14 of the laser distance-measuring instrument 1 and of the stop element 3" at the point of intersection B. Here, the longitudinal axis 14 is parallel to the lines of sight of the distance measurements and in their immediate vicinity. In the device of the prior art which is shown in FIG. 9b, the longitudinal axis of the laser distance-measuring instrument 1 is outside this point of intersection of vertical and horizontal axes of rotation 12. If the base of the laser distance-measuring instrument 1, which is opposite the exit aperture of the laser beam, is now taken as a reference point, a correction 17 has to be taken into account after tilting of the laser distance-measuring instrument from the first measuring position 15 to the second measuring position 16 for the measured distance since the reference point has changed with respect to the distance to the point of intersection B.

| List of reference numerals | |
|---|---|
| 1 | Distance-measuring instrument |
| 2 | Laser beam |
| 2' | Laser detector |
| 3 | First stop element |
| 3' | Second stop element |
| 3" | Third stop element |
| 4 | Installation spike |
| 4' | Curved recess |
| 5 | Magnet |
| 6 | Magnetic field conductor |
| 7 | Hall element |
| 8 | Magnetic field lines |
| 9 | Memory module |
| 10 | Electronics |
| 11 | Electromagnetic signal |
| 12 | Horizontal axis of rotation |
| 12' | Vertical axis of rotation |
| 13 | Stand mount |
| 14 | Longitudinal axis of the laser distance-measuring instrument |
| 15 | First measuring position |
| 16 | Second measuring position |
| 17 | Correction |
| A | Pipe |
| B | Point of intersection of the horizontal and vertical axes of rotation |
| C | Lower measuring point |
| D | Upper measuring point |

What is claimed is:

1. A device for measuring distances comprising:
   a distance-measuring instrument and a stop element, said stop element having an identifier that is uniquely coordinated with said stop element, said distance-measuring instrument being capable of being positioned specifically relative to a reference point by the stop element;
   correction means for taking into account the specific positioning relative to the reference point in the distance measurement, which positioning is effected by said stop element; and
   said correction means adapted to be present in at least one chosen from said distance-measuring instrument and said stop element.

2. The device as claimed in claim 1, wherein identification of the stop element is on the basis of the identifier that is effected by said correction means.

3. The device for measuring distance as claimed in claim 2 wherein said correction means comprises at least one chosen from means for calculation and direct computational correction of a measured value and means for calculation and indication of a correction value to be taken into account in the measurement, it being possible to specify the values relative to the reference point or relative to one or more points related to this reference point, and the correction means comprising means for selecting the points to be calculated.

4. The device for measuring distance as claimed in claim 3 wherein the identifier comprises at least one of the following means designed specifically for the respective stop element:
   a plug connector,
   an integrated circuit or memory module,
   an optical device,
   a magnetic stripe,
   a plurality of magnets and a plurality of Hall elements wherein said Hall elements detect the positions of the magnets.

5. The device for measuring distance as claimed in claim 2 wherein the identifier comprises at least one of the following means designed specifically for the respective stop element:
- a plug connector,
- an integrated circuit or memory module,
- an optical device,
- a magnetic stripe,
- a plurality of magnets and a plurality of Hall elements wherein said Hall elements detect the positions of the magnets.

6. The device as claimed in claim 1 wherein said correction means comprises at least one chosen from means—for calculation and direct computational correction of a measured value and means for calculation and indication of a correction value to be taken into account in the measurement, it being possible to specify the values relative to the reference point or relative to one or more points related to this reference point, and the correction means comprising means for selecting the points to be calculated.

7. The device as claimed in claim 6 wherein the identifier comprises at least one of the following means designed specifically for the respective stop element:
- a plug connector,
- an integrated circuit or memory module,
- an optical device,
- a magnetic stripe,
- a plurality of magnets and a plurality of Hall elements wherein said Hall elements detect the position of said magnets.

8. The device for measuring distances as claimed in claim 1 wherein said distance-measuring instrument has a device by means of which the specific positioning relative to a reference point is taken into account in the distance measurement, the positioning being effected by a stop element identifiable on the basis of an identifier uniquely coordinated with the stop element.

9. The device for measuring distance as claimed in claim 8, wherein, for taking into account the specific positioning, said distance-measuring instrument comprises at least one chosen from—means for the computational correction of a measured value and means for indication of a correction value to be taken into account in the measurement, it being possible to specify the values relative to the reference point or relative to one or more points related to this reference point.

10. The device for measuring distance as claimed in claim 1 wherein said stop element defines distances between its installation surfaces and a holder for a said distance-measuring instrument and said stop element has an identifier uniquely coordinated with this stop element.

11. The device for measuring distance as claimed in claim 10, wherein—automatic identification of the stop element on the basis of the identifier can be effected by said distance-measuring instrument.

12. The device for measuring distance as claimed in claim 11, wherein the identifier comprises at least one of the following means:
- a plug connector,
- an integrated circuit or memory module,
- an optical device,
- a magnetic stripe,
- a plurality of magnets and a plurality of Hall elements wherein said Hall elements detect position of said magnets.

13. The device for measuring distance as claimed in claim 1 wherein said stop element fastens said distance-measuring instrument on a holder, said distance-measuring instrument being mounted so as to be pivotable at least about one horizontal axis of rotation relative to the holder, wherein said stop element is adapted to be exchangeable, said stop element defines exact distances between the holder and said distance-measuring instrument and said distance-measuring instrument is connected by said stop element to the holder so that an axis of a line of sight used as a distance measurement, between said distance-measuring instrument and the object to be measured, or an axis running parallel between a plurality of axes of lines of sight used for distance measurement, between distance-measuring instrument and the object to be measured, intersects the axis of rotation.

14. The device for measuring distance as claimed in claim 13, comprising at least one additional vertical axis of rotation of said distance-measuring instrument relative to the holder, wherein said distance-measuring instrument is connected by said stop element to the holder so that the point of intersection of the two axes of rotation lies on an axis of a line of sight used for the distance measurement, between said distance-measuring instrument and the object to be measured, or between a plurality of axes of lines of sight used for the distance measurement, between said distance-measuring instrument and the object to be measured.

15. The device for measuring distance as claimed in claim 14 wherein said stop element has an identifier which is uniquely coordinated with said stop element and by means of which automatic identification can be effected by the distance-measuring instrument.

16. The device for measuring distance as claimed in claim 15, wherein said identifier comprises one of the following means:
- a plug connector,
- an integrated circuit or memory module,
- an optical device,
- a magnetic stripe,
- a plurality of magnets and a plurality of Hall elements wherein said Hall elements detect the positions of said magnets.

17. The device for measuring distance as claimed in claim 14 wherein said stop element has at least two different, settable states with regard to at least one of the following possibilities for adjustment:
- rotation about the longitudinal axis of the stop element,
- change of the length of the stop element.

18. The distance-measuring device as claimed in claim 13 wherein said stop element has at least two different, settable states with regard to at least one of the following possibilities for adjustment:
- rotation about the longitudinal axis of the stop element,
- change of the length of the stop element.

19. The device for measuring distance as claimed in claim 18 wherein said stop element has an identifier which is uniquely coordinated with said stop element and by means of which automatic identification can be effected by the distance-measuring instrument.

20. The device for measuring distance as claimed in claim 1 wherein said distance-measuring instrument comprises a handheld instrument.

21. The device for measuring distance as claimed in claim 1 wherein said stop element is exchangeable.

* * * * *

UNITED STATES PATENT AND TRADEMARK OFFICE
CERTIFICATE OF CORRECTION

PATENT NO. : 6,879,921 B2
DATED : April 12, 2005
INVENTOR(S) : Gerhard Bögel and Thomas Bösch It is certified that error appears in the above-identified patent and that said Letters Patent is hereby corrected as shown below:

<u>Title page,</u>
Item [75], Inventors, "Thomas Böach" should be -- Thomas Bösch --.
Item [57], ABSTRACT,
Line 6, "orientated" should be -- oriented --.
Line 9, "inc;lude" should read -- include --.

<u>Column 7,</u>
Line 6, "module 9" should be -- module 8 --.

<u>Column 9,</u>
Line 13, "means-for" should be -- means for --.
Line 41, "from-means" should read -- from means --.
Line 49, delete "a" in the second occurrence.
Line 53, "wherein-automatic" should be -- wherein automatic --.

Signed and Sealed this

Twenty-fifth Day of April, 2006

JON W. DUDAS
*Director of the United States Patent and Trademark Office*